(12) United States Patent
Pollard et al.

(10) Patent No.: US 8,800,643 B2
(45) Date of Patent: Aug. 12, 2014

(54) SURFACE COOLER HAVING CHANNELED FINS

(75) Inventors: Berwyn Owain Pollard, Wolverhampton (GB); David Russell Scott, Walsall (GB)

(73) Assignee: HS Marston Aerospace Ltd. (GB)

( * ) Notice: Subject to any disclaimer, the term of this patent is extended or adjusted under 35 U.S.C. 154(b) by 610 days.

(21) Appl. No.: 12/979,042

(22) Filed: Dec. 27, 2010

(65) Prior Publication Data

US 2012/0160466 A1    Jun. 28, 2012

(51) Int. Cl.
*F28F 3/14* (2006.01)
*H05K 7/20* (2006.01)

(52) U.S. Cl.
USPC ............... 165/170; 165/80.3; 165/104.21

(58) Field of Classification Search
CPC ............ H01L 23/473; H05K 7/20336; H05K 7/20163; F28F 2215/06; F28F 2215/10
USPC ........... 165/80.3, 168, 169, 170, 164, 104.21, 165/104.33, 104.14; 361/699, 700
See application file for complete search history.

(56) References Cited

U.S. PATENT DOCUMENTS

| | | | |
|---|---|---|---|
| 3,837,395 A | 9/1974 | Coolidge | |
| 4,145,708 A * | 3/1979 | Ferro et al. | 257/715 |
| 4,151,710 A | 5/1979 | Griffin et al. | |
| 4,523,636 A * | 6/1985 | Meijer et al. | 165/104.26 |
| 4,815,531 A | 3/1989 | Presz, Jr. et al. | |
| 4,871,015 A | 10/1989 | Foley et al. | |
| 5,198,889 A * | 3/1993 | Hisano et al. | 257/678 |
| 5,564,496 A | 10/1996 | Blum et al. | |
| 5,704,416 A * | 1/1998 | Larson et al. | 165/104.33 |
| 6,058,696 A | 5/2000 | Nikkanen et al. | |
| 6,062,302 A * | 5/2000 | Davis et al. | 165/104.26 |
| 6,106,229 A | 8/2000 | Nikkanen et al. | |
| 6,237,223 B1 * | 5/2001 | McCullough | 29/890.032 |
| 6,267,175 B1 | 7/2001 | Anderson | |
| 6,267,176 B1 | 7/2001 | Bolla et al. | |
| 6,410,982 B1 * | 6/2002 | Brownell et al. | 257/714 |
| 7,369,410 B2 * | 5/2008 | Chen et al. | 361/701 |
| 2008/0043437 A1 * | 2/2008 | Refai-Ahmed | 361/700 |
| 2009/0288811 A1 | 11/2009 | Bolla et al. | |

* cited by examiner

*Primary Examiner* — Tho V Duong
(74) *Attorney, Agent, or Firm* — Cantor Colburn LLP

(57) ABSTRACT

A surface cooler includes a base plate, and at least one fin element extending from the base plate. The at least one fin element includes an outer surface portion that is configured and disposed to be in direct contact with a first fluid and an inner surface portion that is configured and disposed to be in direct contact with a second fluid. The at least one fin element defines a primary heat exchange member that is configured and disposed to facilitate an exchange of heat between the first and second fluids.

20 Claims, 4 Drawing Sheets

SURFACE COOLER HAVING CHANNELED FINS

BACKGROUND OF THE INVENTION

Exemplary embodiments pertain to the art of surface coolers and, more particularly, to an aircraft surface cooler having channeled fins.

Typically, a surface cooler is installed in a wall of an aero engine turbofan bypass duct. Normally, the surface cooler is used to cool engine oil but can be used for cooling other fluids. The oil or other fluid travel through a fluid plenum defined, at least in part, by a separating plate that is in a heat conducting relationship with a plurality of fins. The fins protrude into an airflow moving through the bypass duct. In this manner, the separating plate defines a primary heat conducting surface and the fins define secondary heat conducting surfaces or surfaces that are not in direct contact with the fluid from which it is desired to exchange heat.

BRIEF DESCRIPTION OF THE INVENTION

Disclosed is a surface cooler including a base plate, and at least one fin element extending from the base plate. The at least one fin element includes an outer surface portion that is configured and disposed to be in direct contact with a first fluid and an inner surface portion that is configured and disposed to be in direct contact with a second fluid. The at least one fin element defines a primary heat exchange member that is configured and disposed to facilitate an exchange of heat between the first and second fluids.

Also disclosed is a surface cooler including a base plate, and a plurality of fin elements operatively connected to the base plate. Each of the plurality of fin elements includes a fluid channel, and adjacent ones of the plurality of fin elements define a fluid passage. Each of the plurality of fin elements establishes a primary heat exchange member that is configured and disposed to facilitate a direct transfer of heat between a fluid in the fluid channel and a fluid in the fluid passage.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
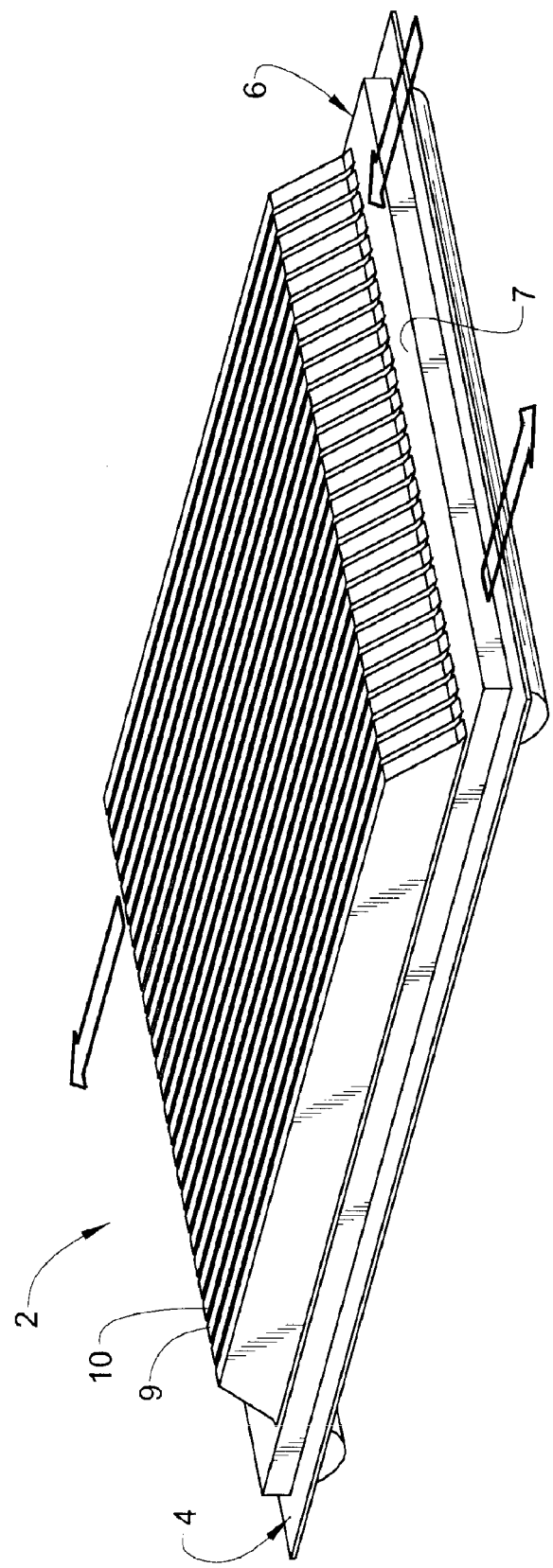
FIG. 1 is an upper left perspective view of a surface cooler including channeled fins in accordance with an exemplary embodiment.
Figure 2:
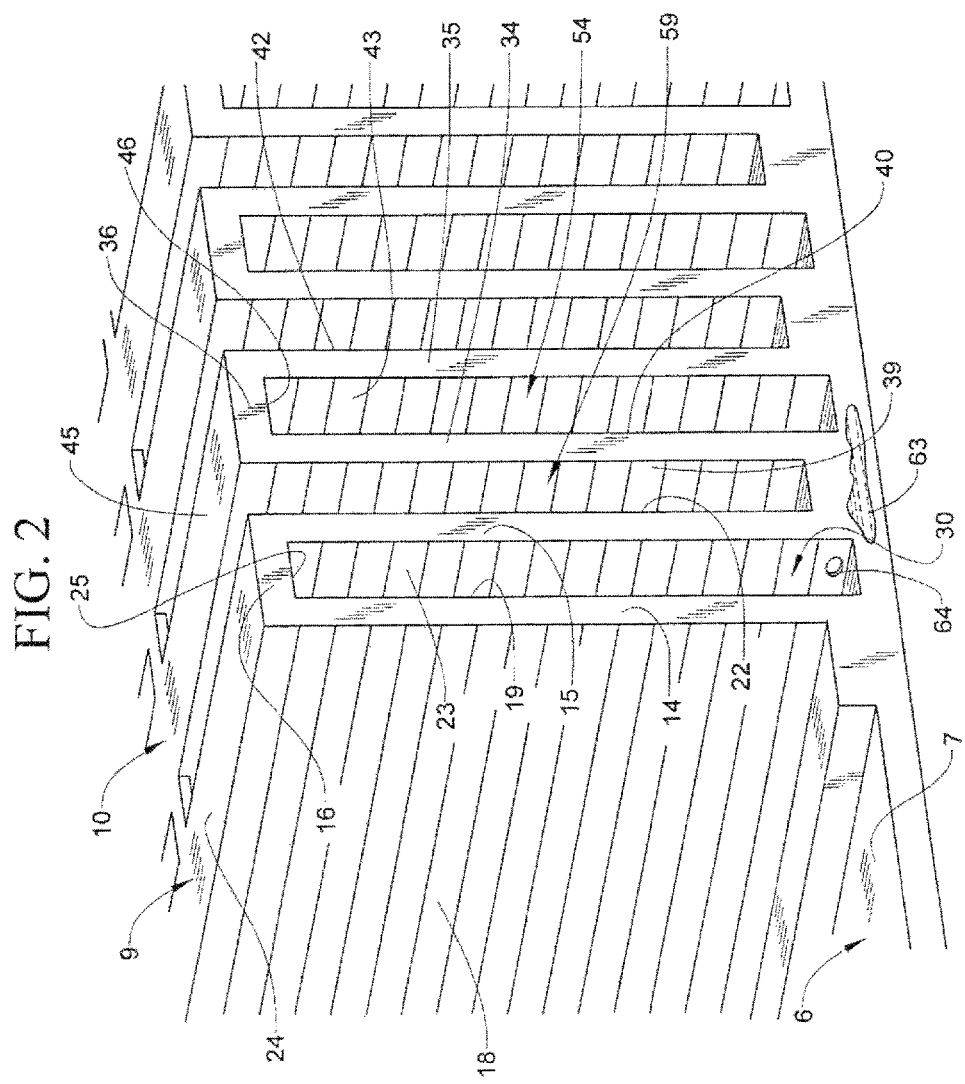
FIG. 2 is a partial, cross-sectional perspective view of the surface cooler of FIG. 1.

With initial reference to FIGS. 1 and 2, a surface cooler constructed in accordance with an exemplary embodiment is indicated generally at 2. Surface cooler 2 is shown mounted to a side plate 4 Surface cooler 2 is shown to include a base plate 6 having an outer surface 7. As will become more fully evident below, base plate 6 serves as a passage for a first fluid. Surface cooler 2 is also shown to include a plurality of fin elements, two of which are indicated at 9 and 10, mounted to outer surface 7. As will also become more fully evident below, the plurality of fin elements establish a primary heat transfer surface. More specifically, the plurality of fins exchange heat directly between the first fluid, such as air, passing over surface cooler 2 and a second fluid, such as oil, passing within base plate 6.

In accordance with an exemplary embodiment, fin element 9 includes a first fin member 14 operatively connected to a second fin member 15 through a third fin member 16. First fin member 14 includes an outer surface 18 and an inner surface 19. Similarly, second fin member 15 includes an outer surface 22 and an inner surface 23, and third fin member 16 includes an outer surface 24 and an inner surface 25. Inner surfaces 19, 23, and 25 collectively define, together with outer surface 7, a fluid channel 30 that is configured to pass the first fluid through an interior of fin element 9.

Similarly, fin element 10 includes a first fin member 34 operatively connected to a second fin member 35 through a third fin member 36. First fin member 34 includes an outer surface 39 and an inner surface 40. Likewise, second fin member 35 includes an outer surface 42 and an inner surface 43, and third fin member 36 includes an outer surface 45 and an inner surface 46. Inner surfaces 40, 43, and 46 collectively define, together with outer surface 7 a fluid channel 54. In a manner similar to that described above, fluid channel 54 passes the first fluid though fin element 10. Fin element 9 is arranged adjacent to fin element 10 so as to define a fluid passage 59 that conducts the second fluid along outer surfaces 22 and 39. Of course, it should be understood that the second fluid could also pass over outer surfaces 24 and 45.

Further shown in FIG. 2, fin element 9 is joined to fin element 10 by a fluid reservoir 63 that is fluidly connected to fluid channel 30 via openings one of which is indicated at 64. With this arrangement, the second fluid, such as air, passes over the plurality of fin elements 9, 10 in a direct, heat exchange relationship with the second fluid passing through each fluid channel 30. The phrase "direct heat exchange relationship" should be understood to mean that the first and second fluids pass along adjacent surfaces, e.g., inner surface 23 and outer surface 22 of, for example, second fin member 15. In this manner, a thermally conductive path between the first and second fluids is maintained as short as possible while still providing adequate heat transfer surfaces and maintaining the second fluid isolated from the first fluid. It should be understood that the direct heat exchange relations does not preclude the use of thermally conductive coatings or the like on one of more surfaces of the plurality of fin elements.

Figure 3:
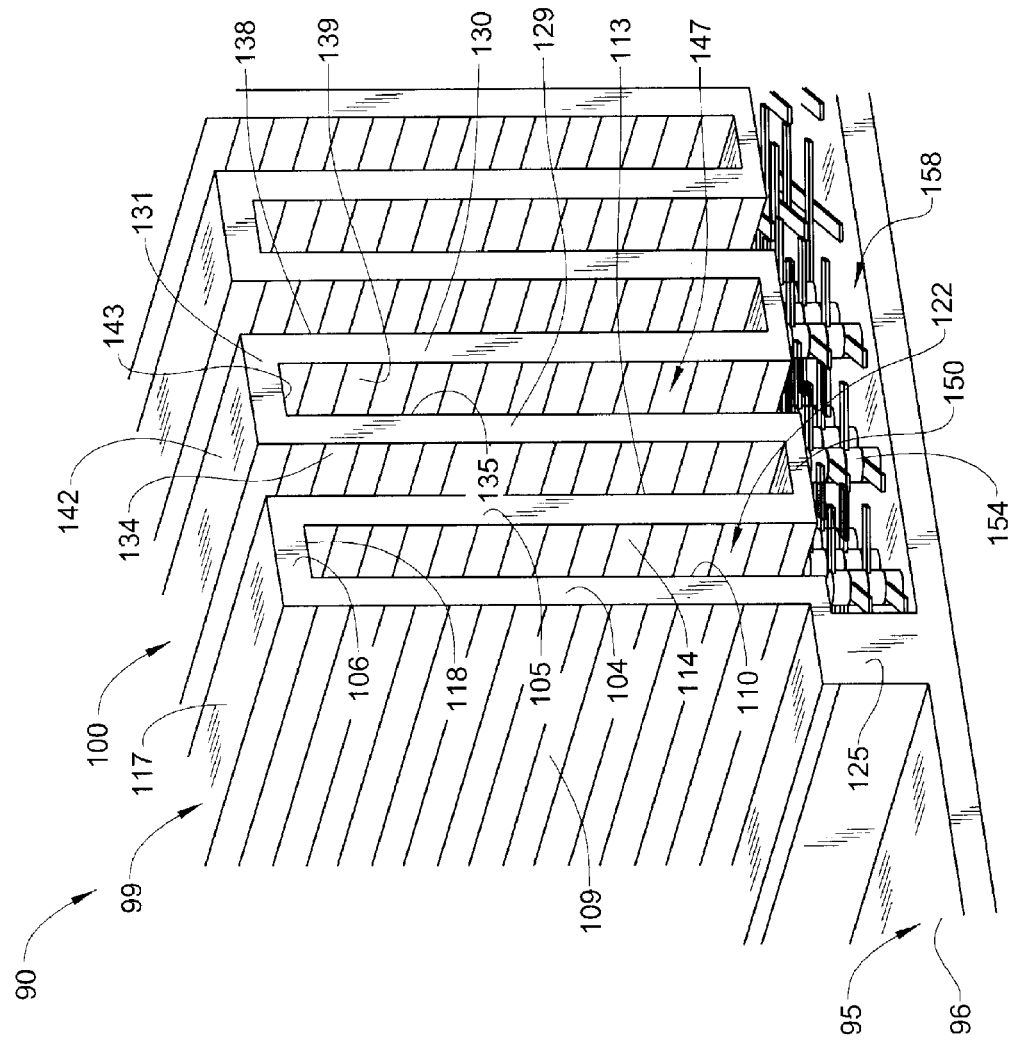
FIG. 3 is a partial, cross-sectional perspective view of a surface cooler constructed in accordance with another aspect of the exemplary embodiment.

Reference will now be made to FIG. 3 in describing a surface cooler 90 constructed in accordance with another aspect of the exemplary embodiment. Surface cooler 90 includes a base plate 95 having an outer surface 96. A plurality of fin elements, two of which are indicated at 99 and 100 extend from outer surface 96. In a manner similar to that described above, fin element 99 includes a first fin member 104 operatively connected to a second fin member 105 through a third fin member 106. First fin member 104 includes an outer surface 109 and an inner surface 110. Similarly, second fin member 105 includes an outer surface 113 and an inner surface 114, and third fin member includes an outer surface 117 and an inner surface 118. Inner surfaces 110, 114, and 118 define a fluid channel 122. In addition, first fin member 104 is shown linked to outer surface 96 of base plate 95 through an edge section 125.

In further accordance with the exemplary aspect, fin element 100 includes a first fin member 129, a second fin member 130, and a third fin member 131. First fin member 129 includes an outer surface 134 and an inner surface 135. Likewise, second fin member 130 includes an outer surface 138 and an inner surface 139, and third fin member 131 includes an outer surface 142 and an inner surface 143. Inner surfaces 135, 139, and 143 define a fluid channel 147 that conducts the second fluid through fin element 100. In the exemplary aspect shown, second fin member 105 of fin element 99 is linked to first fin member 129 of second fin element 100 by a fourth fin member 150. As further shown, fourth fin member 150 is linked to outer surface 96 of base plate 95 by a plurality of heat transfer pins, one of which is indicated at 154. Heat transfer pins 154 provide additional structure to conduct heat between the second fluid, and the plurality of fin elements. In addition to transferring heat, heat transfer pins 154 establish a fluid plenum 158 between outer surface 96 and the plurality of fin elements. Fluid plenum 158 conducts the second fluid along outer surface 96 and through each of the plurality of fin elements in order to further enhance heat transfer from base plate 95.

Figure 4:
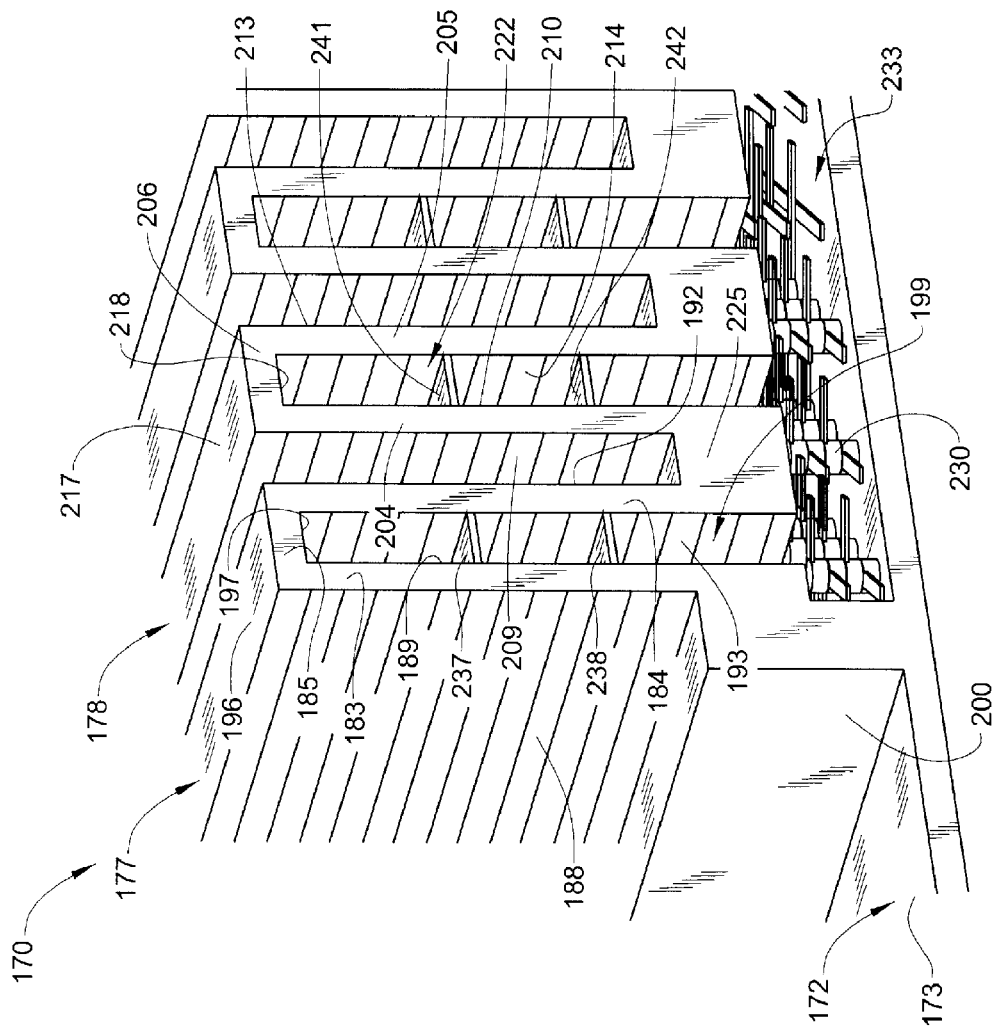
FIG. 4 is a partial, cross-sectional perspective view of a surface cooler constructed in accordance with yet another aspect of the exemplary embodiment.

Reference will now be made to FIG. 4 in describing a surface cooler 170 constructed in accordance with another aspect of the exemplary embodiment. Surface cooler 170 includes a base plate 172 having an outer surface 173. A plurality of fin elements, two of which are indicated at 177 and 178 extend from outer surface 173. In a manner similar to that described above, fin element 177 includes a first fin member 183 operatively connected to a second fin member 184 through a third fin member 185. First fin member 183 includes an outer surface 188 and an inner surface 189. Similarly, second fin member 184 includes an outer surface 192 and an inner surface 193, and third fin member 185 includes an outer surface 196 and an inner surface 197. Inner surfaces 189, 193, and 197 define a fluid channel 199. In addition, first fin member 183 is shown linked to outer surface 173 of base plate 172 through an edge section 200.

In further accordance with the exemplary aspect, fin element 178 includes a first fin member 204, a second fin member 205, and a third fin member 206. First fin member 204 includes an outer surface 209 and an inner surface 210. Likewise, second fin member 205 includes an outer surface 213 and an inner surface 214, and third fin member 206 includes an outer surface 217 and an inner surface 218. Inner surfaces 210, 214, and 218 define a fluid channel 222 that conducts the second fluid through fin element 178. In the exemplary aspect shown, second fin member 184 of fin element 177 is linked to first fin member 204 of second fin element 178 by a fourth fin member 225. As further shown, fourth fin member 225 is linked to outer surface 173 of base plate 172 by a plurality of heat transfer pins, one of which is indicated at 230. Heat transfer pins 230 provide additional structure to conduct heat between the second fluid, and the plurality of fin elements. In addition to transferring heat, heat transfer pins 230 establish a fluid plenum 233 between outer surface 173 and the plurality of fin elements. Fluid plenum 233 conducts the second fluid along outer surface 173 and through each of the plurality of fin elements in order to further enhance heat transfer from second fluid.

In further accordance with the exemplary aspect shown, fin element 177 is provided with a plurality of turbulator members 237 and 238 that extend through fluid channel 199. In the exemplary embodiment shown, turbulator members 237 and 238 take the form of straight bars that extend between inner surfaces 189 and 193. However, it should be understood that turbulator members can take on a variety of forms such as being arranged in a staggered profile or formed to have curvilinear surfaces. Similarly, fin element 178 is provided with turbulator members 241 and 242 that extend along fluid channel 222 between inner surfaces 210 and 214. Turbulator members 237, 238, and 241, 242 create currents within fluid channels 199 and 222 respectively. The currents enhance heat transfer between the second fluid and fin elements 177 and 178.

At this point it should be understood that the exemplary embodiments provide a system for heat transfer between two fluids. The heat is transferred directly from one fluid to another through one or more fin elements. In contrast to prior art configurations where the fin elements took the form of secondary heat transfer surfaces, i.e., there was no direct contact with each the fluid receiving heat and the fluid giving up heat, the fin elements of the exemplary embodiment are in direct, heat exchange contact with both the heat receiving fluid and the fluid giving up heat.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A surface cooler comprising:
   a base plate; and
   at least one fin element extending from the base plate, the at least one fin element having an outer surface portion that is configured and disposed to be in direct contact with a first fluid and an inner surface portion that is configured and disposed to be in direct contact with a second fluid, the at least one fin element defining a primary heat exchange member that is configured and disposed to facilitate an exchange of heat between the first and second fluids, wherein the at least one fin element is operatively connected to the base plate through one or more heat transfer pins formed of a plurality of heat transfer elements stacked one on another.

2. The surface cooler according to claim 1, wherein the at least one fin element includes a first fin member operatively connected to a second fin member through a third fin member to define a fluid channel.

3. The surface cooler according to claim 2, wherein the first fin member is coupled to the second fin member by at least one turbulator member, the at least one turbulator member being configured and disposed to agitate the second fluid passing through the fluid channel.

4. The surface cooler according to claim 1, wherein the at least one fin element includes a first fin element arranged in a spaced relationship relative to a second fin element.

5. The surface cooler according to claim 4, wherein the first fin element includes a first fin member operatively connected to a second fin member through a third fin member that defines a first fluid channel, and the second fin element includes a first fin member operatively connected to a second fin member through a third fin member that defines a second fluid channel.

6. The surface cooler according to claim 5, wherein the second fin member of the first fin element and the first fin member of the second fin element define a fluid passage.

7. The surface cooler according to claim 5, wherein the second fin member of the first fin element is operatively connected to the first fin member of the second fin element.

8. The surface cooler according to claim 7, wherein the second fin member of the first fin element is operatively connected to the first fin member of the second fin element through a fluid reservoir.

9. The surface cooler according to claim 7, wherein the second fin member of the first fin element is operatively connected to the first fin member of the second fin element through a fourth fin member.

10. The surface cooler according to claim 9, wherein the fourth fin member is operatively connected to the base plate through the one or more heat transfer pins.

11. The surface cooler according to claim 10, wherein the one or more heat transfer pins establish a fluid plenum between the base plate and the fourth fin member.

12. A surface cooler comprising:
a base plate; and
a plurality of fin elements operatively connected to the base plate, each of the plurality of fin elements including a fluid channel, and adjacent ones of the plurality of fin elements define a fluid passage, each of the plurality of fin elements establishing a primary heat exchange member that is configured and disposed to facilitate a direct transfer of heat between a fluid in the fluid channel and a fluid in the fluid passage, wherein at least one of the plurality of fin elements is operatively connected to the base plate through one or more heat transfer pins formed from a plurality of heat transfer elements stacked one on another.

13. The surface cooler according to claim 12, wherein the plurality of fin elements includes at least a first fin element and a second fin element.

14. The surface cooler according to claim 13, wherein the first fin element includes a first fin member operatively connected to a second fin member through a third fin member to define a first fluid channel, and the second fin element includes a includes a first fin member operatively connected to a second fin member through a third fin member to define a second fluid channel.

15. The surface cooler according to claim 14, wherein the second fin member of the first fin element and the first fin member of the second fin element define the fluid passage.

16. The surface cooler according to claim 14, wherein the second fin member of the first fin element is operatively connected to the first fin member of the second fin element.

17. The surface cooler according to claim 16, wherein the second fin member of the first fin element is operatively connected to the first fin member of the second fin element through a fluid reservoir.

18. The surface cooler according to claim 16, wherein the second fin member of the first fin element is operatively connected to the first fin member of the second fin element through a fourth fin member.

19. The surface cooler according to claim 18, wherein the fourth fin member is operatively connected to the base plate through the one or more heat transfer pins.

20. The surface cooler according to claim 14, wherein the first fin member is coupled to the second fin member by at least one turbulator member, the at least one turbulator member being configured and disposed to agitate the second fluid passing through the fluid channel.

* * * * *